Jan. 16, 1940.  A. R. THOMPSON ET AL  2,187,063
DEPTH GAUGING PEACH PITTER
Filed Oct. 29, 1937
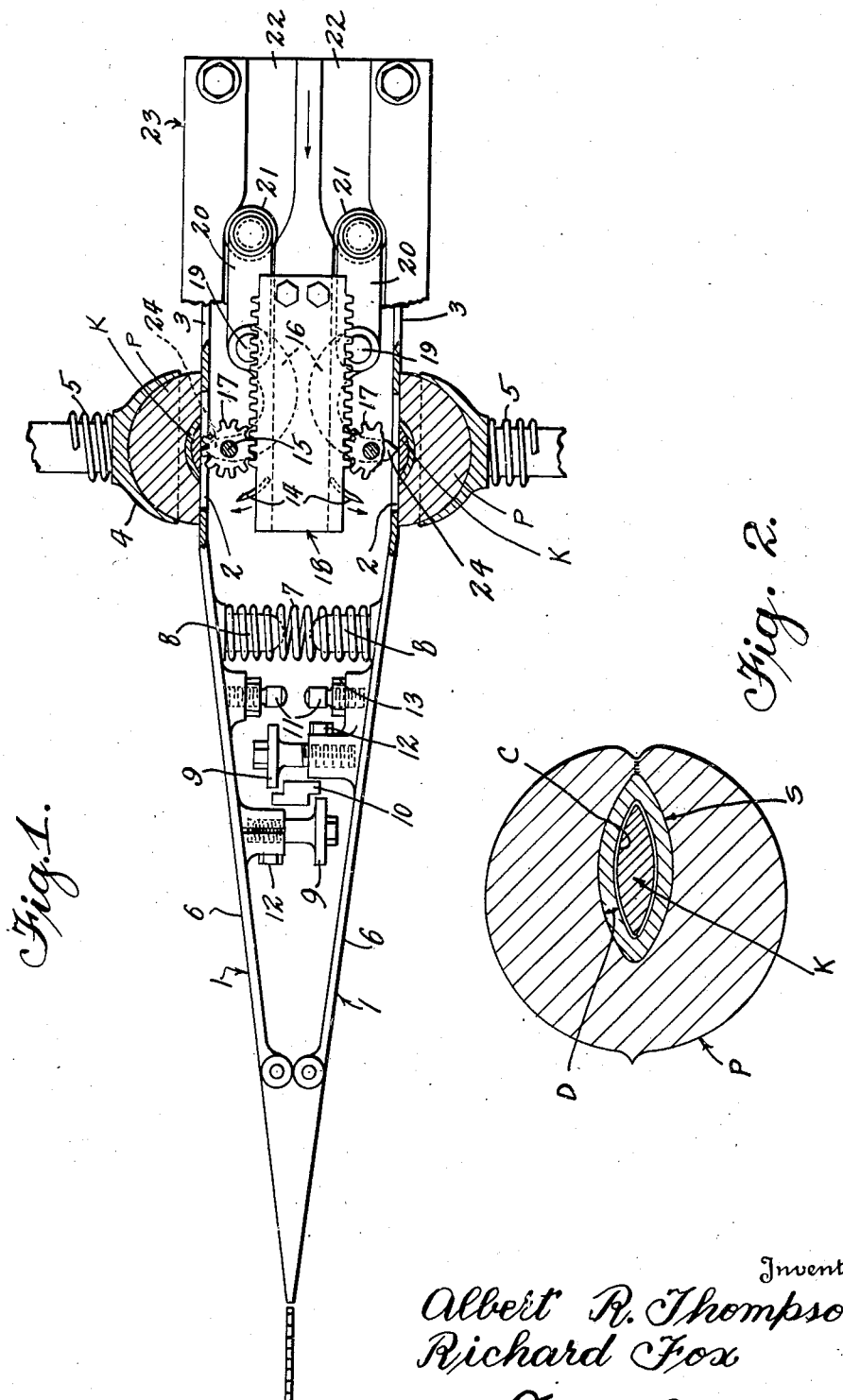
Inventors
Albert R. Thompson
Richard Fox
By Lyon & Lyon
Attorneys

Patented Jan. 16, 1940

2,187,063

UNITED STATES PATENT OFFICE 2,187,063

DEPTH GAUGING PEACH PITTER

Albert R. Thompson, Los Gatos, and Richard Fox, San Jose, Calif., assignors to Pacific Machinery Company, San Francisco, Calif., a corporation of California Application October 29, 1937, Serial No. 171,734

10 Claims. (Cl. 146—28)

This invention relates to peach pitting machines, and is more particularly adapted to peach pitters for removing pits from clingstone peaches and the like.

In the pitting of clingstone peaches there has for a long time existed in the art a problem with reference to the removal of the pits from the fruit halves while removing from the fruit halves a minimum of the flesh of the fruit where the fruit pits are intact and in what is known in the art as "split pits". This problem has heretofore been fairly well solved. However, there always exists a certain percentage of clingstone peaches with split pits, and during certain seasons it has been found that the percentage of split pits has been very high, resulting in ineffective use of peach pitting machines which have been designed and constructed for use of peaches having intact pits.

In peaches having split pits there is apparently exerted a tendency on behalf of the pit to embed itself into the flesh of the fruit. It has been noted in some instances that the split surface of a half pit will lie as much as one-quarter of an inch below the surface of the flesh of the split peach. It is obvious that under such conditions a pitting knife adjusted to remove a pit lying in its normal position would strike and fracture a pit which is abnormally deeply positioned in the fruit half, and thus shatter or tear out the fruit pit in endeavoring to remove the same from the peach half.

In fruit having split pits, there is always exhibited a tendency of the pits to fracture into more or less irregular shapes, and to mush or flatten out, making it necessary under such circumstances likewise to remove a large slice of the pit flesh in order to insure that the pit has been entirely removed.

In approaching this problem of removing pits from peaches, many and divers suggestions have been made, and there have been used pitters which use surface contacting plates which contact the surface of the flesh of the fruit in an attempt to gauge the depth to which the pitting knife will penetrate into the flesh of the fruit. With such "mushed", flattened out, or embedded pit halves it will be obvious that such devices, depending upon contact with the cut surface of the peach half in order to determine the depth to which the pitting knife will go, must fail, or must in all cases remove from the peach half more of the flesh than is actually required.

In split pits, even where the pits are actually split in a line of suture, it has likewise been found that the pit is not evenly halved. This is due to the fact, as has been found, that in a great many peaches the pits grow off-center in relation to the line of suture of the peach, so that very often a peach having one large half and one small half will have the small half of the pit positioned in the large half of the fruit, and the large half of the pit will be located in the small half of the fruit.

In seeking a solution of this problem of removing just that quantity of the flesh of the fruit as is required in order to make a clean cut of the pit half from the flesh of the fruit, applicants have discovered that the shell of a peach pit, measured from the bottom of the kernel cavity to the exterior of the surface of the pit, will not vary more than .035 to .040 of an inch. Applicants have also discovered that the kernel contained in the kernel cavity of a peach pit is relatively soft in its consistency so that it is readily pierced by a relatively blunt instrument and presents no obstruction to the use of a depth gauge being forced into contact with the pit shell from the interior of the kernel cavity.

It is therefore an object of this invention to provide a peach pitting machine in which there is provided a means for positioning a fruit pit with relation to a pitting knife by determining the position of the shell of the pit from within the pit cavity.

Another object of this invention is to provide a fruit pitting machine in which means are provided for determining the cut to be made by a pitting knife by determining the position of the pit of the fruit from within the pit cavity.

Another object of this invention is to provide a machine for removing halved pits from halved peaches in which there is provided a means for gauging the position of the half pit by penetrating the pit kernel in the kernel cavity to thereby determine the position of the interior of the shell of the pit.

Another object of this invention is to provide a machine for removing pits from previously halved fruit which includes a pitting means for cutting the pit from the halved fruit, and a means which is adapted to contact the pit shell to position the pitting knife with relation to the pit shell.

Other objects and advantages of this invention it is believed will be apparent from the following detailed description of a preferred embodiment thereof as illustrated in the accompanying drawing.

In the drawing:

Figure 1 is a plan view diagrammatic in character of a peach pitter embodying our invention.

Figure 2 is an enlarged sectional elevation of a halved peach illustrating a pit thereof likewise in section.

In the preferred embodiment of our invention as illustrated in the accompanying drawing, there is shown a peach half P in which there is shown in section a pit or stone S. The shell of the pit or stone, measured in the direction indicated at D, we have found to be, as an illustrative example, three-sixteenths of an inch, plus or minus, .035 to .040. The shell of the pit S includes a kernel cavity C in which there is positioned the kernel K. The kernel K is relatively soft so that it may be easily or readily penetrated by a depth gauging means which, after penetrating the kernel, will engage the inner hard surface of the shell within the pit cavity C.

Our invention is predicated upon this discovery of substantial uniformity of the dimension D in order to position a pitting knife so that it will remove from the half of the peach P just the desired amount of flesh of the fruit in order to produce a clean cut pit cavity from which the pit is removed, together with all the "red center" which surrounds the pit.

In carrying out our invention we have illustrated the same as applied to a certain construction of halved peach pitter. However, it will be obvious that our invention is not in any way limited to the pit type of peach pitter in which we may adapt the invention we have made. In the illustrated form of peach pitter shown in the accompanying drawing, a pair of dividing plates 1 are shown by which the halves of the split peach are separated preparatory to positioning the same with respect to the orifices 2 of the plates 3. In positioning the halves of the fruit, any desired means may be employed, and we have herein illustrated a pair of holding cups 4 into which the halves of the peach are positioned and held with relation to the plates 3. The cups 4 are yieldably mounted so that they would yield away from the surface of the plates 3 and are normally urged toward the plates 3 by means of springs 5.

The plates 3 are provided with smooth contacting surfaces 6 along which the halves of the peaches may be slid in positioning the same with reference to the plates 3. The dividing plates 1 may be of any suitable or desirable construction and are preferably mounted in such a manner as to have limited movement toward and away from each other.

A spring 7 is mounted upon lugs 8 carried by the respective plates 1 normally acting to urge the plates 1 away from each other.

A stop means consisting of adjustable stop bolts 9 and a stationary stop lug 10 is provided between the dividing plates 1 to limit the separation of the plates, and cap screws 11 are adjustably threaded in bosses provided in the undersides of the plates 1 in order to limit the movement of the plates 1 toward each other. In connection with each of the stops, lock means are provided as illustrated at 12 and 13, respectively, for locking the adjustment of these stop members. A spring pressure exerted by the springs 5 normally urges separating plates 1 toward each other as determined by the adjustment of the cap screws 11.

Pitting knives 14 of any suitable or desirable construction are provided for cutting the flesh of the fruit halves from the pits. The knives 14 are carried by shafts 15, which shafts 15 may be supported in any suitable or desirable manner such, for example, as by suitable bearings carried by the frame structure.

Mounted on the shafts 15 are pinions 17 which mesh with the teeth in the rack 18. The depth gauges 16 are adjustably secured to the shafts 19 supported by the frame structure so as to be positioned in definite relation to the orifices 2 of the plates 3.

Arms 20 are secured to the shafts 19 and extend away from the shafts 19 in a direction opposite to the extent of the depth regulators 16 and carry at their outermost ends cam rollers 21. The cam rollers 21 are carried in cam ways 22. The cam ways are formed in a slide 23 to which the rack 18 is likewise connected.

The operation of the peach pitter embodying our invention is:

The peach P, halved by any suitable or desirable means such, for example, as a saw, while held between the cups 4 is, by movement of the cups 4, slid along the smooth surface 6 of the separating plates 1 in order to separate the halves of the peach and position the same with respect to the orifices 2 of the plates 3. When thus positioned, the operating slide unit 23 is moved by any suitable or desirable means in a direction indicated by the arrow A to cause the cam rollers 21 to ride in cam ways 22.

The first portion of the operation is to cause the points 24 of the gauging members 16 to penetrate the kernel K of the pit S to the depth of the interior of the shell of the pit S and force the peach half and cup 4 away from the pitting knife mounting by compressing the spring 5. Spring 7 will cause the plate 3 to follow the peach and thus steady the peach half in the cup 4. The above described movement of the peach depends upon the depth of the kernel cavity from the cut surface of the peach. The pitting knife 14 then enters the flesh of the fruit and cuts just that amount of the flesh of the fruit away from the peach halves as is determined by the operation of the depth member 16 in pushing the peach halves backward away from the plates 3 against the pressure exerted by the springs 5. Continued movement of the slide 23 causes the rack 18 to travel with reference to the pinion 17, completing the revolution of the pitting knives 14 around the pits, thus severing the halves of the fruit from the pit. As the slide is returned to its original position, the knives 14 return to their starting position and the depth gauging members raise from contact with the pits, thus clearing the halves of the fruit of the severed pits.

It will be obvious from the foregoing that the position of the pit within the halves of the fruit will determine the extent to which the gauging members 16 move the peach halves back away from the plates 3 against the pressure of the springs 5, thus insuring that the pit will be cut from the peach halves with only that exact amount of flesh as may be required in order to remove all of the red center from around the pit.

In order to effect an adjustment of the depth regulating member 16 as may be required for example with different varieties of peaches or the like, the depth regulators 16 may have their position adjusted on the shafts 19 with relation to the arms 20 to thereby adjust the relation of the depth regulators 16 with reference to the pitting knives 14.

Having fully described our invention, it is to be understood that the particular embodiment herein illustrated and described is set forth for illustrative purposes only and our invention is susceptible of a wide range of adaptability of different type machines without in any way departing from our invention as defined by the appended claims.

We claim:

1. A peach pitting device for removing halved pits from the previously split peach, including means for holding the peach half, pitting means for cutting the pit half from the halved peach, and means adapted to contact the pit shell from within the kernel cavity of the pit and operative to move said pit shell to a previously determined position.

2. A peach pitting device for removing the halved pits from the previously split peach, including depth regulators adapted to contact the pit shell from within the kernel cavity to move said pit shell to a previously determined position, and pitting means operative to sever the halved pits from the fruit halves.

3. In a peach pitting device for removing a halved pit from the previously split peach, including means for holding a peach half, depth regulating means adapted to contact the inner surface of the pit shell, from within the kernel cavity and pitting means secured in operative relation to the depth regulating means for severing the pit from the fruit half.

4. The process of removing halved pits from the previously split peach comprising the steps of piercing the kernel cavity of said peach and engaging the inner surface of the pit shell with an instrument, moving said instrument to a previously determined position, and passing a knife in an arc a previously determined distance from said instrument.

5. The process of removing halved pits from the previously split peach comprising the steps of engaging from within the kernel cavity the inner surface of the pit shell with an instrument, moving said instrument and said pit shell to a previously determined position, and passing a knife around said pit shell so positioned.

6. The process of removing halved pits from the previously split peach comprising the steps of engaging from within the kernel cavity the inner surface of the pit shell with an instrument to determine the position of the pit, and then passing a knife in an arc a previously determined distance from said instrument.

7. A peach pitting device for removing halved pits from the previously split peach including means for engaging the inner surface of the pit shell, means for positioning said engaging means in a previously determined position, and means for passing a knife in an arc a previously determined distance from said engaging means.

8. In a peach pitting device for removing a halved pit from a previously split peach, means for severing the halved pit from the fruit, and depth regulating means operatively associated with the pit severing means, said depth regulating means being adapted to contact the inner surface of the pit shell from within the kernel cavity to determine the position of the pit relative to the pit-severing means.

9. In a peach pitting device, the combination of a holding cup, an orificed plate, a pitting means, means for yieldably urging the cup toward the orificed plate, and depth regulating means operatively connected with the pitting means and adapted to engage the inner surface of the pit shell of a halved fruit as held by the cup to move said pit shell to a previously determined position, and means to then actuate the pitting means.

10. In a fruit pitting device, the combination of a pair of separating plates having pitting orifices therein, pitting means positioned to operate through said orifices, holding cups for holding peach halves in position over the orifices in said plates, and depth regulating means operative through said orifices to engage the inner surface of the pit shells as carried in said holding cups to move said pit shells to a previously determined position, and means to then actuate the pitting means.

ALBERT R. THOMPSON.
RICHARD FOX.